Figures 1, 2, 3:
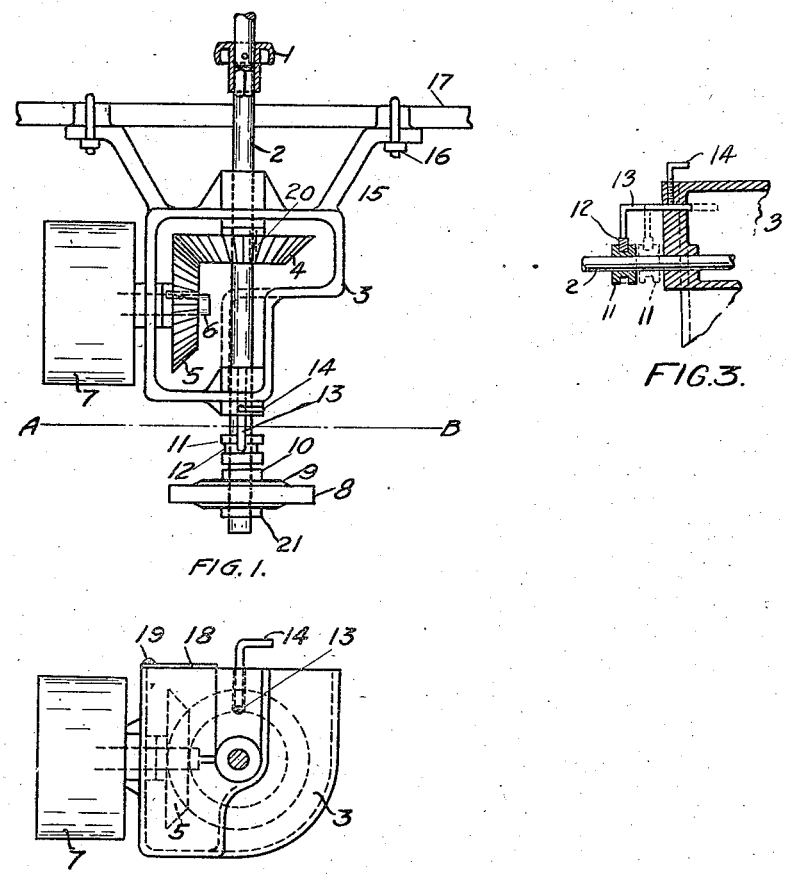

Feb. 15, 1927.  
W. H. HEATON  
1,617,638  
AUTOMOBILE POWER TRANSMISSION ATTACHMENT  
Filed Oct. 8, 1924

WITNESSES

INVENTOR.  
W. H. Heaton

Patented Feb. 15, 1927.

1,617,638

UNITED STATES PATENT OFFICE.

WILLIAM H. HEATON, OF SAN LUIS OBISPO, CALIFORNIA, ASSIGNOR OF ONE-HALF TO CHARLES M. FREY, OF SAN FRANCISCO, CALIFORNIA.

AUTOMOBILE POWER-TRANSMISSION ATTACHMENT.

Application filed October 8, 1924. Serial No. 742,435.

My invention consists of certain improvements in a pulley power attachment to convey belt power from an automobile engine and consists of improvements over all other similar devices. It consists of a device which is clamped by bolts to the front end of the automobile whereby the power is conducted to a pulley on the attached device. The device itself connects with the crankshaft of the automobile in such a way that it can be thrown in and out of gear. The main shaft of the device is extended in order that an emery stone may be attached for grinding tools. The main belt pulley may be taken off and replaced by a spool pulley for cable or rope.

Figure 1 is a plan view of the entire machine; Figure 2 is an elevation at section A—B designed to show that the gear case is made the shape of the gears; and Figure 3 is a detail sectional view of the shaft locking mechanism.

Fan belt pulley 1 is attached to motor shaft at one end and receives the drive shaft 2 in a square receptacle at the opposite end. Bevel gear 4 splined by key 20 to shaft 2 drives bevel gear 5 secured to shaft 6 to which is secured the drive pulley 7. Emery wheel 8 is secured to extension of shaft 2 by flange 9, flange collar 10 and flange nut 21. The mechanism is disengaged from the motor by pulling shaft 2 from the receptacle in belt pulley 1. Collar 11 secured by pin to shaft 2 carries fork 12 to which is fastened bar 13. Bar 13 and fork 12 and thumb screw 14 function to hold shaft 2 in the ingear and the out-of-gear positions. Cover 18 for gear case is held in place by screw 19.

The fan pulley 1 which is secured to the crankshaft that drives main shaft 2 is cored out between rim and hub in order that it may be attached to the crankshaft by the same pin which held original fan belt pulley. A cotter key holds the pin in place, which makes it very convenient for assembling and removing. In other similar devices this pulley is a solid casting riveted to the crankshaft which makes it very difficult to attach or detach, or it is held on with a taper pin and in either instance there is danger of its working out and causing injury to the attachment or the car.

With particular reference to Figure 1, it will be noted that the combination coupling and pulley, 1, is provided with a round opening in one end thereof which is adapted to fit upon and be secured to the drive shaft of the motor, whereas its opposite end is provided with a square opening which receives the squared end of the shaft, 2. In this manner the attachment may be readily disconnected from the motor shaft when desired to drive the car only. The disengagement is, of course, accomplished by moving the shaft, 2, in a longitudinal direction until the squared end of the shaft, 2, has been disengaged from the square opening in the coupling, 1.

The main gear case 3 is cast in one piece and has an oil tight plate cover 18 held fast by screw 19. The case conforms to the shape of the gears on all sides as shown by Figures 1 and 2, and being so shaped it provides a bath of oil for the gears at all times with small amount of lubricants in the gear case. The gear case 3 being in one piece and not split makes it impossible for the lubricants to escape. The bearings in the improved case 3 are bronze bushings pressed into the case, which provides a desirable surface.

The main shaft 2 is extended beyond line A—B in order to attach an emery stone for grinding tools. The emery wheel 8 is held in place by flange 9 and flange collar 10 and flange nut 21. By removing flange nut 21 only emery wheel 8 may be attached or removed, as flange 9 and flange collar 10 are stationary. The engine may be cranked through shaft 2 by applying a crank that fits on a specially designed nut 21.

My improved power transmission device is provided with suitable legs or extensions, 15, which are provided with openings for the reception of bolts, 16, to permit its ready attachment to the transverse frame member, 17, of the automobile chassis.

I claim:

A power attachment for automobiles, a relatively stationary gear casing, a shaft slidably mounted within the gear casing and arranged in alignment with the drive shaft of the automobile, a pulley rotatably mounted on the outer side of said casing, gears mounted within the casing for imparting motion to said pulley, a coupling carried by the outer end of the motor drive shaft and having a polygonal opening for receiving the mating end of said driven shaft for imparting rotation thereto, a grinder wheel means carried by the outer end of the driven shaft for supporting the grinder wheel, a grooved collar securely mounted upon the driven shaft, a slidably mounted bar in engagement with said collar, and means for locking the slidably mounted bar in the engaging or disengaging position of the driven shaft with respect to the motor shaft.

W. H. HEATON.